(12) United States Patent
Hahn et al.

(10) Patent No.: US 8,216,990 B2
(45) Date of Patent: *Jul. 10, 2012

(54) COMPOSITION FOR PROTECTION OF GLASSWARE IN DISHWASHER

(75) Inventors: Karlheinz Ulrich Gerhard Hahn, Ludwigshafen (DE); Karin Werner, Ludwigshafen (DE)

(73) Assignee: Reckitt Benckiser N.V., Hoofddorp (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/012,373

(22) Filed: Jan. 24, 2011

(65) Prior Publication Data

US 2011/0118167 A1 May 19, 2011

Related U.S. Application Data

(63) Continuation of application No. 12/472,804, filed on May 27, 2009, which is a continuation of application No. 10/575,201, filed as application No. PCT/GB2004/004410 on Oct. 18, 2004, now abandoned.

(30) Foreign Application Priority Data

Oct. 17, 2003 (GB) .................................. 0324295.5
Feb. 28, 2004 (GB) .................................. 0404469.9

(51) Int. Cl.
| | | |
|---|---|---|
| *C11D 7/20* | (2006.01) | |
| *C11D 7/10* | (2006.01) | |
| *B08B 9/20* | (2006.01) | |
| *C03C 3/16* | (2006.01) | |
| *C03C 3/00* | (2006.01) | |

(52) U.S. Cl. ....... 510/227; 510/514; 252/387; 134/25.1; 134/25.2; 501/45; 501/46; 501/47; 501/48; 501/49; 501/73

(58) Field of Classification Search .................... None
See application file for complete search history.

(56) References Cited

U.S. PATENT DOCUMENTS

| | | | | |
|---|---|---|---|---|
| 2,726,161 | A * | 12/1955 | Beck et al. ...................... | 501/34 |
| 2,853,393 | A * | 9/1958 | Beck et al. ...................... | 501/34 |
| 3,677,820 | A * | 7/1972 | Rutkowski .................... | 134/25.2 |
| 4,198,232 | A * | 4/1980 | Parr et al. ....................... | 148/437 |
| 4,416,794 | A * | 11/1983 | Barrat et al. ................... | 510/514 |
| 4,443,270 | A * | 4/1984 | Biard et al. ................... | 134/25.2 |
| 4,743,302 | A * | 5/1988 | Dumesnil et al. ............. | 106/1.23 |
| 4,908,148 | A * | 3/1990 | Caravajal et al. ............. | 510/514 |
| 5,011,902 | A * | 4/1991 | Foucht ............................ | 528/55 |
| 5,341,358 | A * | 8/1994 | Kobayashi et al. ........... | 369/100 |
| 5,721,068 | A * | 2/1998 | West et al. ..................... | 429/300 |
| 5,728,349 | A * | 3/1998 | Persson ......................... | 420/513 |
| 6,344,295 | B1 * | 2/2002 | Huot .............................. | 429/229 |
| 6,582,507 | B1 * | 6/2003 | Cao et al. ....................... | 106/479 |
| 7,261,760 | B2 * | 8/2007 | Ishida et al. .................... | 75/255 |
| 7,361,632 | B2 * | 4/2008 | Hahn ............................. | 510/227 |
| 7,456,142 | B2 * | 11/2008 | Hahn ............................. | 510/227 |
| 7,741,236 | B2 * | 6/2010 | Hahn et al. ..................... | 501/46 |
| 2002/0012608 | A1 * | 1/2002 | Takaoka et al. ............... | 420/561 |
| 2003/0052299 | A1 * | 3/2003 | Umeda et al. ................ | 252/62.6 |
| 2003/0220182 | A1 * | 11/2003 | Izuki .............................. | 501/46 |
| 2004/0018933 | A1 * | 1/2004 | Ogino et al. ................... | 501/45 |
| 2004/0138043 | A1 * | 7/2004 | Kasuga et al. ................. | 501/45 |
| 2007/0181224 | A1 * | 8/2007 | Marya et al. .................. | 148/400 |

FOREIGN PATENT DOCUMENTS

EP 0 010 587 * 1/1983

* cited by examiner

*Primary Examiner* — Joseph D Anthony

(74) *Attorney, Agent, or Firm* — Norris McLaughlin & Marcus PA

(57) ABSTRACT

The present invention provides a composition. The composition comprises zinc and bismuth. The composition is for use in the protection of glassware in an automatic dishwashing process from detrimental effects caused by exposure to aluminum.

15 Claims, No Drawings

COMPOSITION FOR PROTECTION OF GLASSWARE IN DISHWASHER

This application is a Continuation application of U.S. patent application Ser. No. 12/472,804, filed on May 27, 2009, which is a Continuation application of U.S. patent application Ser. No. 10/575,201, filed on Jun. 5, 2006, which is a 371 National Phase application of PCT/GB2004/004410 filed Oct. 18, 2004, which claims priority to British applications 0324295.5 and 0404469.9, filed Oct. 17, 2003 and Feb. 28, 2004, respectively.

The present invention relates to a composition comprising zinc and bismuth for use in the protection of glassware in an automatic dishwasher process particularly from detrimental phenomena caused by the presence of aluminium.

The problem of glassware corrosion in automatic dishwasher processes is well recognised. It has been put forward that the problem of glassware corrosion is the result of two separate phenomena. Firstly, it is suggested that the corrosion is due to leakage of minerals from the glass network, accompanied by hydrolysis of the silicate network. Secondly, silicate material is suggested to be released from the glass.

These phenomena can cause damage to glassware after a number of separate wash cycles. The damage may include cloudiness, scratches, streaks and other discoloration/detrimental effects.

Silicate materials have been suggested to be effective in preventing materials from being released by the glass composition. However, the use of silicate compounds can have detrimental side effects, such as the tendency to increase separation of silicate material at the glass surface.

A further solution has been to use zinc, either in metallic form (such as described in U.S. Pat. No. 3,677,820) or in the form of compounds. The use of soluble zinc compounds in the prevention of glassware corrosion in a dishwasher is described in, for example, U.S. Pat. No. 3,255,117.

The use of glasses and ceramics containing zinc has been found to address the problem of glassware corrosion in a dishwasher. WO-A-01/64823 describes the use of a ceramic composition comprising zinc to protect glassware in an automatic dishwashing process. GB-A-2 372 500 and WO-A-00/39259 describe the use of a soluble glass composition comprising zinc (present in the form of ions) to protect glassware in an automatic dishwashing process. The use of a ceramic/glass zinc containing composition overcomes the problems of poor solubility/precipitation described above whilst offering effective glassware protection.

However, there is still a problem associated with the ceramic/glass zinc containing compositions (and also with water soluble/insoluble zinc compounds) in that these compositions do not perform satisfactorily in the prevention of decorated glassware corrosion.

Bismuth has been used as an additive to aid the prevention of corrosion of glazed glassware corrosion. For example, BE 860180 describes the use of bismuth to avoid damage of decorated, glazed articles. However, the value of bismuth in this purpose has been diminished by the detrimental effects that the use of bismuth compound has on other components of the washing process. In this regard bismuth has been found to stain plastic materials (such as Tupperware®). Bismuth also causes the formation of a brown stain on non-decorated glassware and cutlery. Also although the glazed portion of the glassware may receive protection, bismuth has been found to stain the non-glazed portions. For these reasons the use of bismuth as a glaze protector has been avoided.

A further problem which may be encountered when washing glassware in a dishwasher, and which has as yet not been addressed by automatic dishwasher detergent manufactures, is that caused by the presence of aluminium ions in the dishwasher.

In the past aluminium has been put forward as a glass corrosion inhibition agent in, for example, U.S. Pat. No. 3,255,117 and WO-A-96/36687, for fine tableware such as lead crystal.

However, there is some doubt that aluminium is entirely effective in this aim: whilst a reduction in mass loss and cord lines, when the glass is washed repeatedly in an automatic dishwasher is observed, glass clouding is exacerbated.

Additionally, a major problem with the use of aluminium is that, with use, the glassware adopts an iridescence. This has the effect of changing the glass from being transparent and colourless to having a coloured hue. Indeed, it has been observed that the detrimental efficacy of aluminium in this regard is so high that even when aluminium is present in a very small amount in the dishwasher liquor this effect is observed. As an example, the use of aluminium based dyes in dishwasher detergents, even in the minuscule quantities that such dyes are required, is avoided so that the iridescence effect does not occur.

Clearly this detrimental effect on glassware is undesirable. As a result the presence of aluminium in automatic dishwashing detergents has had to be avoided. However, although the aluminium content of a detergent (and also the automatic dishwashing machine) can be controlled and is usually kept as low as possible, the action of a consumer can still lead to exposure of glassware to aluminium. This can happen if, for example, a user washes an aluminium item (such as a common household garlic press) in an automatic dishwasher. In this instance the release of aluminium into the dishwasher liquor is enough to cause the detrimental effects described above. This effect may even be apparent after the single wash cycle the effect has also been observed if the user washes other aluminium items such as some pre-prepared food containers in the dishwasher. The effect may also be caused if the dishwasher contains any exposed aluminium components such as screws or sieves.

The problem of metallic aluminium dissolution leading to the iridescent issues is particularly pronounced in a dishwashing machine as the dishwasher liquor is normally alkaline and aluminium dissolution enhanced at high pH.

A further detrimental effect associated with the use of aluminium is that aluminium is known to exacerbate glass clouding corrosion. This is in contrast to the positive effect of aluminium on mass loss and cord lines. Clearly this detrimental effect prevails over any positive effect and is to be avoided.

It is an object of the present invention to obviate/mitigate the problems outlined above.

According to a first aspect of the present invention there is provided the use of a composition comprising zinc and bismuth for the protection of glassware in an automatic dishwashing process from detrimental effects caused by exposure of the glassware to aluminium.

It will be appreciated that the composition is for use in addressing potential problems which may be caused by exposure of glassware to a source of aluminium in a dishwasher liquor.

In the present invention it is understood that the term glassware includes items made of glass (such as drinking glasses and plates) which may be decorated (such as with a glaze and/or with etching/glass addition). The term glassware is also understood to include other items of houseware, which may comprise a material other than glass (such as a ceramic) but which have a glass/glaze coating or decoration (such as a glazed ceramic plate).

It has been found that a combination of zinc and bismuth has especially beneficial properties in the prevention of detrimental effects (such as iridescence) caused by the presence of aluminium in the dishwasher liquor in an automatic dishwashing process. Additionally the use of the composition is highly effective at protecting normal glassware and also the composition has been found to be highly effective in protecting glazed glassware/crockery. Thus a single composition may now be used to provide glassware corrosion protection for both decorated glassware/crockery and non-decorated glassware in a dishwasher, as well as tackling the issues raised by the presence of aluminium.

The ratio of zinc to bismuth in the composition used is preferably in the range from 1:100 to 100:1 (based on mass of the metals). More preferably the ratio of zinc to bismuth in the composition (by mass) is from 1:10 to 10:1, more preferably from 1:5 to 5:1 and most preferably about 1:1.

Bearing the ratios outlined above in mind, the amount of zinc and bismuth provided to a dishwasher cycle is preferably from 1 to 1000 mg, more preferably from 1 to 500 mg, more preferably from 1 to 200 mg and more preferably 5 to 100 mg. Preferably this weight refers to the combined weight of both metals.

Most preferably the zinc and bismuth are available as ions in the dishwasher washing liquor.

The zinc and bismuth may be in any suitable form to provide ions in the dishwasher liquid.

One example of a suitable form is the use of a metallic form of the metals. This form may be as separate forms of each metal disposed within the dishwasher. Such forms have been found to be solubilised over a number of wash cycles, to provide soluble ions of bismuth and zinc. The metal form may also comprise an admixture (such as an alloy) of zinc and bismuth. The alloy may contain further elements, such as other metal elements necessary to ensure stability/solubility of the alloy.

Preferred physical forms of the metal/alloy include sheets, perforated sheets, fibres, granules, powders, blocks (e.g. cuboid) or an admixture thereof.

Another example of a suitable form is the use of a salt or compound of one or both of bismuth and zinc. Most preferably the salt/compound is one which has an appreciable solubility in the washing liquor so that the effect of the zinc and bismuth can be observed. However, a salt of either element which only has a low solubility may also be used. In the latter case (as when a metallic form of one or more of the elements themselves is used) the amount of salt/compound which is used in the dishwasher may be increased accordingly to counter the low solubility of the low solubility salts.

Most preferably the salt/compound does not contain a component which is aggressive/detrimental to the dishwasher/dishwasher contents. In the case where the salt/compound is ionic it is preferred that the salt/compound is free from chloride anions which are recognised to have a detrimental effect on dishwashers (more particularly on stainless steel dishwasher components/cutlery).

Preferred examples of soluble metal salts include compounds with anions such as nitrate, sulphate, halide (especially fluoride), phosphate (where soluble), carbonate and carboxylate (such as the anions from $C_1$-$C_{10}$ mono or multi carboxy function containing carboxylic acids, especially acetate and citrate).

Preferred examples of metal compounds having a lower solubility include the oxides of the metals.

An admixture of more than one compound may be used. Also a different compound of each metal may be used.

Most preferably the salt/compound is part of a detergent formulation. The detergent formulation may comprise a rinse aid.

The detergent formulation may be any common detergent formulation of the type which are usually employed with dishwashers. The formulation may comprise a liquid, gel, powder or tablet formulation. Where the formulation is a liquid/gel generally the zinc and bismuth will be present in solution within the liquid/gel. However, it is also contemplated to have the zinc and bismuth present in the liquid/gel in the form of an insoluble salt/compound so that the zinc/bismuth may comprise a suspended particle (e.g. such as a "speckle" typically found in these formulations).

The detergent formulation normally comprises other components which are typically found in dishwasher detergent formulations. In this regard the detergent formulation typically comprises one or more components selected from the group comprising surfactants (non-ionic, anionic, cationic and zwitterionic), builders, enzymes, foam suppressants, bleaches, bleach activators, thickeners, perfumes and dyes.

It is most preferred that when the bismuth and zinc are present together in a dishwasher detergent formulation, the metals comprise from 0.002 to 6 wt % (based on the weight of both metals) of the detergent formulation. More preferably the metals comprise from 0.01 to 3 wt % and most preferably from 0.02 to 1.3 wt % of the dishwasher detergent formulation (e.g. 0.4 wt % for a 20 g tablet).

In the case of a rinse aid, especially when the rinse aid is the only source of bismuth and zinc for the dishwasher, it is preferred that the metals comprise from 0.03 to 30 wt % (based on the weight of both metals) of the rinse aid formulation. More preferably the metals comprise from 0.15 to 15 wt % and most preferably from 0.3 to 7 wt % of the rinse aid formulation.

The zinc and/or bismuth may also be present in a soluble ceramic/glass formulation. The glass/ceramic may contain a glass forming material such as silica ($SiO_2$) or a boron oxide (e.g. $B_2O_3$), an alkali/alkaline metal oxide (e.g. $Na_2O$, $K_2O$, CaO) and/or a phosphorus oxide (e.g. $P_2O_5$).

The glass/ceramic may comprise a homogenous body or in the alternative may be ground/crushed. Where the glass/ceramic is ground or crushed it preferably has an average particle size of less than 500 μm.

It will also be appreciated that for all the forms of the bismuth and zinc mentioned above an admixture of different forms, wherein each metal is present in a different physical format may be used.

In this regard it is also possible that one of the metals may be present in an additive whilst the other metal may be present in a detergent/rinse-aid formulation. As an example the zinc may be present in the dishwasher detergent/rinse-aid together with one or more other detergent components whilst the bismuth may be added as a separate additive such as a glass composition which is disposed within the dishwasher machine. Clearly other combinations of physical forms which satisfy the requirement that both bismuth and zinc are supplied to the wash liquor in accordance with the present invention.

Strangely it has also been found that when a combination of bismuth and zinc has been used to address the problems caused by the presence of aluminium in the dishwasher liquor not only have the detrimental effects caused by the aluminium being eliminated but furthermore the positive effects of the bismuth and zinc on the prevention of decorated and non-decorated glassware corrosion have been enhanced.

Thus in accordance with the second aspect of the invention there is provided a composition comprising zinc, bismuth and aluminium for the protection of the glassware in an automatic dishwasher.

Surprisingly when this composition is used in an automatic dishwasher over repeated wash cycles the previously observed detrimental effect of glass clouding attributed to the presence of aluminium is vastly reduced.

It will be appreciated that features of the first aspect of the invention shall apply mutatis mutandis to the second aspect of the invention.

The aluminium may be present in the composition in any form (e.g. metallic form, fully/partially soluble aluminium salt/organic compound). Preferably the aluminium is present in the formulation such that from 5 to 200 mg of aluminium is released per wash cycle.

Additionally it has been found that when a combination of zinc and bismuth has been used to address the problems caused by the presence of aluminium ions in the dishwasher, this composition, if used in combination with a source of silicate, is able to achieve the same effects in terms of glass corrosion protection but also corrosion protection for aluminium items placed in the dishwasher (previously a widely observed problem) is greatly improved.

Thus in accordance with a third aspect of the invention there is provided a composition comprising zinc, bismuth and silicate for the protection of aluminium items in an automatic dishwasher.

Surprisingly when this composition is used in an automatic dishwasher over repeated wash cycles the previously observed detrimental occurrence of aluminium corrosion is vastly reduced.

It will be appreciated that features of the first aspect of the invention shall apply mutatis mutandis to the third aspect of the invention.

Preferably the amount of silicate is present in a ratio of up to 1000:1 based on the weight of the zinc and bismuth components (with the term weight referring to the weight of the elements per se in any compound/admixture containing same). More preferably the amount of silicate is present in a ratio to zinc and bismuth of up to 500:1 and most preferably up to 100:1.

The silicate may be present in the composition in any form (e.g. fully/partially soluble salt, organic compound (e.g. silicone), water soluble glass or ceramic).

The silicate preferably comprises an admixture of a metal oxide (e.g. an alkali metal oxide such as sodium $Na_2O$ or potassium $K_2O$) and silica ($SiO_2$). The preferred ratio of silica to metal oxide is between 1.0 to 4.0. A preferred example of a silicate is a metal (e.g. an alkali metal) disilicate such as $Na_2Si_2O_5$, (metal oxide to silica ratio of 2.0).

The invention is now further described with reference to the following non-limiting Examples.

EXAMPLES

Glassware Corrosion Examples

In the Examples the following detergent composition (as shown in Table GL 1a) was used as a detergent formulation base. The formulation was used in tablet form.

TABLE GL 1a

| Component | % |
|---|---|
| Sodium Tripolyphosphate | 45.0 |
| Sodium Bicarbonate | 2.0 |
| Sodium Carbonate | 18.5 |
| Sodium Perborate | 10.0 |
| TAED | 2.5 |
| Protease | 1.5 |
| Amylase | 0.5 |
| Non-ionic Surfactant | 3.5 |
| Polyethylene-glycol) | 7.5 |
| Perfume + Dye | 0.3 |
| Auxiliaries | Rest |

In the Examples the following glass composition was used as a source of zinc and bismuth (as shown in Table GL 1b). The glass formulation used was in the form of a solid body (measuring 4 cm×1 cm×1 cm).

TABLE GL 1b

| Component | % |
|---|---|
| $P_2O_5$ | 60.0 |
| $K_2O$ | 20.3 |
| $Bi_2O_3$ | 3.2 (2.86% Bi) |
| $B_2O_3$ | 1.3 |
| CaO | 1.0 |
| ZnO | 14.2 (11.4% Zn) |

When used in accordance with the method described below the mass loss of the glass block was on average 0.35 g/cycle, equating to 10 mg $Bi^{3+}$ per cycle and 40 mg $Zn^{2+}$ per cycle.

Test Method

In the Examples test glasses were washed 50 to 100 times in a special endurance test dishwasher (Miele G 541 Special).

Cleaning Dosage: A 20 g tablet of the base detergent described above was used with alternative additives (as specified in the Examples). Automatic dosing of the tablet occurred at the beginning of the cleaning cycle.

Water Hardness in the machine: less than 0.5 dGH, central softening through ion exchangers, internal ion exchangers not in operation.

Cleaning program 65° C. (both the cleaning and the rinse cycle were operated at 65° C.).

Water consumption per cycle: 23.5 liters.

There was no soiling of the glassware tested.

The test report comprised the following types of glass:

Clear Glasses

Luigi Bormoli (Italy):
"linea Michelangelo David" C32 Whitewine glass 19 cl.

Arc-International (France):
"Luminarc Octime Transparent", Whisky glass 30 cl.
"Longchamp", 17 cl, Stemglass, lead crystal glass.
"Arcoroc Elegance", Wineglass, 14.5 cl.

Ruhr Kristall Glas (Germany):
"Kölner Stange", 24 cl, beer glass.
"RKG Bier", Beer Stemware, 38 cl.

Nachtmann Bleikristallwerke (Germany):
"Longdrink-glass", special edition (dishwasher sensitive), produced especially for Reckitt Benckiser.

Decorated Glassware

Ruhr Kristall Glas (Germany):
"Snoopy Look In", Longdrink Nordland 28 cl.
"Teddy", Primusbecher 16 cl.

Arc-International (France):
"Kenia", dinner plate, 19.5 cm.

The weight loss was determined gravimetrically after 50 to 100 test washes. Visible changes to the glass surface were evaluated in natural light (iridescence) or in a special light box (glass clouding, line corrosion and decoration damage). The dimensions of the light box were 70 cm×40 cm×65 cm (l×b×h) and the inside of the box was painted matte black. The box was lit from above with an L 20w/25S (60 cm long) Osram lamp, which was covered in front with a screen. Shelves were disposed in the box on which the glasses were placed for evaluation. The box was open at the front.

The glass corrosion was evaluated using the following criteria; glass clouding (GC), line corrosion (CL), decoration damage (DS) and iridescence (IR). For each parameter a score was given in accordance with the table below.

| Evaluation | Damage Impact |
| --- | --- |
| 0 | No glass damage |
| 1 | First minor damage/hardly visible |
| 2 | Slight damage, visible to expert or in the light box |
| 3 | Visible damage |
| 4 | Strong damage, clearly visible |

Comparative Example 1

In this Comparative Example only the base detergent formulation was used.

The results of the tests are shown in Table GL 2a (Glass Corrosion) and Table GL 2b (Mass Loss).

TABLE GL 2a

| | Glass Corrosion | | | | | |
| --- | --- | --- | --- | --- | --- | --- |
| | 50 cycles | | | 100 Cycles | | |
| Glasses | GC | CL | IR | GC | CL | IR |
| Michelangelo | 2.5 | 3.0 | 0.0 | 2.5 | 4.0 | 0.0 |
| Octime | 1.0 | 3.0 | 0.0 | 2.0 | 4.0 | 0.0 |
| Longchamp | 3.5 | 3.0 | 0.0 | 4.0 | 4.0 | 0.0 |
| RKG Kölsch | 0.5 | 3.0 | 0.0 | 1.0 | 4.0 | 0.0 |
| RKG Bier | 2.5 | 3.5 | 0.0 | 3.0 | 4.0 | 0.0 |
| Nachtmann Longdrink | 3.0 | 0.0 | 0.0 | 4.0 | 0.0 | 0.0 |
| Arcoroc Elegance | 3.0 | 3.5 | 0.0 | 4.0 | 4.0 | 0.0 |
| Average | 2.29 | 2.71 | 0.0 | 2.93 | 3.43 | 0.0 |

| Decorated Glassware | DS | IR | DS | IR |
| --- | --- | --- | --- | --- |
| Snoopy | 3.0 | — | 3.5 | — |
| Teddy | 3.5 | — | 4.0 | — |
| Kenia Plates | 3.5 | 0.0 | 4.0 | 0.0 |
| Average | 3.33 | — | 3.83 | — |

TABLE GL 2b

| | Mass Loss | |
| --- | --- | --- |
| | 50 cycles Mass Loss (mg) | 100 cycles Mass Loss (mg) |
| Glasses | | |
| Michelangelo | 35 | 59 |
| Octime | 25 | 48 |
| Longchamp | 58 | 94 |
| RKG Kölsch | 24.5 | 45.5 |
| RKG Bier | 40 | 72 |
| Nachtmann Longdrink | 70 | 124 |
| Arcoroc Elegance | 17 | 30 |
| Sum | 269.5 | 472.5 |
| Decorated Glassware | | |
| Snoopy | 223 | 502 |
| Teddy | 67 | 145 |
| Kenia Plates | 110 | 230 |
| Sum | 400 | 877 |

Comparative Example 2

In this Comparative Example only the base detergent formulation was used. In addition an aluminium garlic press was present in the dishwasher.

The results of the tests are shown in Table GL 3a (Glass Corrosion) and Table GL 3b (Mass Loss).

TABLE GL 3a

| | Glass Corrosion | | | | | |
| --- | --- | --- | --- | --- | --- | --- |
| | 50 cycles | | | 100 Cycles | | |
| Glasses | GC | CL | IR | GC | CL | IR |
| Michelangelo | 2.5 | 1.5 | 2.5 | 4.0 | 4.0 | 3.0 |
| Octime | 2.5 | 2.0 | 2.0 | 3.0 | 3.5 | 2.5 |
| Longchamp | 1.5 | 2.0 | 3.0 | 4.0 | 4.0 | 3.0 |
| RKG Kölsch | 1.5 | 1.0 | 2.0 | 3.5 | 3.0 | 2.5 |
| RKG Bier | 3.0 | 2.0 | 2.5 | 4.0 | 4.0 | 3.0 |
| Nachtmann Longdrink | 3.5 | 0.0 | 3.0 | 4.0 | 0.0 | 3.5 |
| Arcoroc Elegance | 2.0 | 0.5 | 2.0 | 4.0 | 3.0 | 2.0 |
| Average | 2.36 | 1.29 | 2.5 | 3.79 | 3.07 | 2.81 |

| Decorated Glassware | DS | IR | DS | IR |
| --- | --- | --- | --- | --- |
| Snoopy | 2.5 | — | 3.5 | — |
| Teddy | 2.5 | — | 3.5 | — |
| Kenia Plates | 3.0 | 3.0 | 3.5 | 3.0 |
| Average | 2.67 | — | 3.5 | — |

TABLE GL 3b

| | Mass Loss | |
| --- | --- | --- |
| | 50 cycles Mass Loss (mg) | 100 cycles Mass Loss (mg) |
| Glasses | | |
| Michelangelo | 8 | 25 |
| Octime | 5.5 | 12.5 |
| Longchamp | 21 | 49 |
| RKG Kölsch | 6 | 13 |
| RKG Bier | 23 | 53 |
| Nachtmann Longdrink | 24 | 55 |
| Arcoroc Elegance | 7 | 14 |
| Sum | 94.5 | 221 |

TABLE GL 3b-continued

| | Mass Loss | |
|---|---|---|
| | 50 cycles Mass Loss (mg) | 100 cycles Mass Loss (mg) |
| Decorated Glassware | | |
| Snoopy | 77 | 181 |
| Teddy | 16 | 46 |
| Kenia Plates | 35 | 93 |
| Sum | 128 | 320 |

Comparative Examples 1 and 2 show that whilst aluminium is able to provide mass loss/line corrosion protection for both decorated and non-decorated glassware it causes an iridescence effect on both decorated and non-decorated glassware (when present in the dishwasher liquor in metallic form as a garlic press). Aluminium also exacerbates glass clouding corrosion—this is particularly noticeable after 100 wash cycles.

Example 1

In this Example the bismuth and zinc containing glass was used in addition to the base detergent tablet.

The aluminium garlic press was also present in the dishwasher.

The results are shown in Table GL 4 (Iridescence).

TABLE GL 4

| | Iridescence | |
|---|---|---|
| | 50 cycles IR | 100 Cycles IR |
| Glasses | | |
| Michelangelo | 0.0 | 0.0 |
| Octime | 0.0 | 0.0 |
| Longchamp | 0.0 | 0.0 |
| RKG Kölsch | 0.0 | 0.0 |
| RKG Bier | 0.0 | 0.0 |
| Nachtmann Longdrink | 0.0 | 0.0 |
| Arcoroc Elegance | 0.0 | 0.0 |
| Average | 0.0 | 0.0 |
| Decorated Glassware | | |
| Snoopy | — | — |
| Teddy | — | — |
| Kenia Plates | 0.0 | 0.0 |
| Average | — | — |

The results of Example 1 show that the presence of both bismuth and zinc completely eliminates the detrimental effect of iridescence caused by the presence of the aluminium.

Example 2

In this Example the bismuth and zinc containing glass was used in addition to the base detergent tablet.

The aluminium garlic press was also present in the dishwasher (however, please see next paragraph).

The results of the tests are shown in Table GL 5a (Glass Corrosion) and Table GL 5b (Mass Loss). In these tables the figures shown in parentheses were achieved in the absence of aluminium—namely with only the detergent formulation and the bismuth and zinc water soluble glass block. The remaining figures show the results achieved in the presence of the aluminium garlic press.

TABLE GL 5a

| | Glass Corrosion | | | |
|---|---|---|---|---|
| | 50 cycles | | 100 Cycles | |
| Glasses | GC | CL | GC | CL |
| Michelangelo | 0.5 (1.5) | 1.0 (1.5) | 2.5 (2.0) | 1.5 (3.0) |
| Octime | 2.0 (2.5) | 1.0 (1.0) | 2.5 (2.5) | 1.5 (2.5) |
| Longchamp | 0.0 (1.0) | 0.5 (1.0) | 0.5 (2.5) | 1.0 (3.0) |
| RKG Kölsch | 0.0 (0.0) | 1.0 (1.0) | 0.0 (1.0) | 2.0 (2.0) |
| RKG Bier | 1.5 (1.5) | 1.0 (0.5) | 2.0 (2.0) | 1.0 (2.0) |
| Nachtmann Longdrink | 2.0 (2.5) | 0.0 (0.0) | 4.0 (4.0) | 0.0 (0.0) |
| Arcoroc Elegance | 1.5 (2.0) | 1.0 (1.5) | 2.5 (3.5) | 2.0 (2.5) |
| Average | 1.07 (1.57) | 0.79 (0.93) | 2.0 (2.50) | 1.29 (2.14) |
| Decorated Glassware | | DS | | DS |
| Snoopy | | 1.0 (1.5) | | 2.0 (2.5) |
| Teddy | | 1.5 (2.0) | | 2.5 (2.5) |
| Kenia Plates | | 1.0 (2.0) | | 2.0 (3.0) |
| Average | | 1.17 (1.83) | | 2.17 (2.67) |

TABLE GL 5b

| | Mass Loss | |
|---|---|---|
| | 50 cycles Mass Loss (mg) | 100 cycles Mass Loss (mg) |
| Glasses | | |
| Michelangelo | 3.0 (11) | (25) |
| Octime | 0.0 (14.5) | (20.5) |
| Longchamp | 3.0 (19) | (30) |
| RKG Kölsch | 2.0 (9.5) | (18.5) |
| RKG Bier | 5.0 (13) | (26) |
| Nachtmann Longdrink | 0.0 (26) | (34) |
| Arcoroc Elegance | 2.0 (9) | (14) |
| Sum | 15.0 (102) | (168) |
| Decorated Glassware | | |
| Snoopy | 7.0 (62) | 21.0 (121) |
| Teddy | 6.0 (24) | 13.0 (46) |
| Kenia Plates | 20.0 (33) | 31.0 (61) |
| Sum | 33.0 (119) | 65.0 (228) |

Example 2 surprisingly shows that a formulation containing a combination of zinc and bismuth, when combined with a source of aluminium (the garlic press) provides enhanced glassware corrosion protection (when compared to a combination of zinc and bismuth).

Additionally the enhanced glassware corrosion protection is achieved without observation of any of the detrimental effects that would normally be caused by the presence of aluminium. Namely both iridescence caused by the presence of aluminium and excessive glass clouding are not observed.

These effects are both unexpected.

Furthermore the composition offers protection for both non-decorated and decorated glassware.

Aluminium Corrosion Examples

In the Examples the following detergent composition (as shown in Table AL1a) was used as a detergent formulation base. The formulation was used in tablet form.

TABLE AL1a

| Component | % |
|---|---|
| Sodium Tripolyphosphate | 45.0 |
| Sodium Bicarbonate | 2.0 |
| Sodium Carbonate | 18.5 |
| Sodium Perborate | 10.0 |
| TAED | 2.5 |
| Protease | 1.5 |
| Amylase | 0.5 |
| Non-ionic Surfactant | 3.5 |
| Polyethylene-glycol) | 7.5 |
| Perfume + Dye | 0.3 |
| Auxiliaries | Rest |

Test Method

In the Aluminium Examples the test methods used were as those used in the Glass Examples.

Clear Glasses

The glasses used (decorated and non-decorated) were as those used in the Glass Examples. The evaluation of the glass corrosion was carried out in the same manner as for the Glass Examples.

Aluminium Plates

Two aluminium plates were added to the dishwasher. The plates comprised an alloy of magnesium and aluminium as (ALMg4 96% aluminium and 4% magnesium). The plates measured 100 mm×50 mm×1.5 mm and weighed 20 g.

The weight loss was determined gravimetrically after 50 to 100 test washes.

The aluminium corrosion was evaluated using the following criteria; discoloration aluminium (DA) and Shine Units (SU). For DA a score was given in accordance with the table below.

| Evaluation | Damage Impact |
|---|---|
| 0 | No aluminium damage |
| 1 | First minor damage/hardly visible |
| 2 | Slight damage, visible to expert |
| 3 | Visible damage |
| 4 | Strong damage, clearly visible |

For SU the measurement technique according to the "Colour Guide Gloss" for handhold instruments from the company BYK Gardner GmbH was used. With the D65/10° setting and the measurement aperture set at 11 mm, ten evaluations on the back and ten on the front side of the plate were performed. The measurement from these twenty evaluations was averaged.

Comparative Example 1

In this Comparative Example only the base detergent formulation was used.

The results of the tests are shown in Table AL2a (Glass Corrosion) and Table AL2b (Mass Loss).

TABLE AL2a

| | Glass Corrosion | | | | | |
|---|---|---|---|---|---|---|
| | 50 cycles | | | 100 Cycles | | |
| Glasses | GC | CL | IR | GC | CL | IR |
| Michelangelo | 1.5 | 1.5 | 3.0 | 3.0 | 4.0 | 3.5 |
| Octime | 2.5 | 1.5 | 1.5 | 2.5 | 1.5 | 1.5 |
| Longchamp | 1.5 | 1.5 | 2.5 | 3.5 | 2.5 | 4.0 |
| RKG Kölsch | 0.5 | 1.5 | 2.0 | 2.0 | 2.0 | 2.0 |
| RKG Bier | 1.0 | 1.0 | 1.5 | 2.0 | 1.5 | 3.0 |
| Nachtmann Longdrink | 3.0 | 0.0 | 2.0 | 4.0 | 0.0 | 3.0 |
| Arcoroc Elegance | 1.0 | 0.5 | 1.0 | 3.5 | 2.0 | 1.5 |
| Average | 1.57 | 1.07 | 2.06 | 2.93 | 1.93 | 2.75 |
| Decorated Glassware | DS | IR | | DS | IR | |
| Snoopy | 2.0 | — | | 3.0 | — | |
| Teddy | 1.5 | — | | 2.5 | — | |
| Kenia Plates | 2.0 | 3.0 | | 2.5 | 3.5 | |
| Average | 3.33 | — | | 2.67 | — | |
| Al-Plates | DA | | | DA | SU | |
| Plate | 1.0 | | | 1.5 | 4.1 | |

TABLE AL2b

| | Mass Loss | |
|---|---|---|
| | 50 cycles Mass Loss (mg) | 100 cycles Mass Loss (mg) |
| Glasses | | |
| Michelangelo | 7 | 59 |
| Octime | 9 | 48 |
| Longchamp | 15 | 94 |
| RKG Kölsch | 7 | 45.5 |
| RKG Bier | 6 | 72 |
| Nachtmann Longdrink | 15 | 124 |
| Arcoroc Elegance | 7 | 30 |
| Sum Decorated Glassware | 66 | 472.5 |
| Snoopy | 25 | 502 |
| Teddy | 12 | 145 |
| Kenia Plates | 20 | 230 |
| Sum Al-Plates | 57 | 877 |
| Plate | 2138 | 4698 |

Comparative Example 2

In this Comparative Example only the base detergent formulation was used. In addition 3.67 g of sodium disilicate was added to the tablet formulation.

The results of the tests are shown in Table AL3a (Glass Corrosion) and Table AL3b (Mass Loss).

TABLE AL3a

| | Glass Corrosion | | | | | |
|---|---|---|---|---|---|---|
| | 50 cycles | | | 100 Cycles | | |
| Glasses | GC | CL | IR | GC | CL | IR |
| Michelangelo | 2.0 | 3.5 | 3.5 | 2.5 | 4.0 | 4.0 |
| Octime | 2.5 | 3.0 | 3.0 | 3.5 | 4.0 | 3.5 |
| Longchamp | 4.0 | 3.5 | 3.5 | 4.0 | 4.0 | 4.0 |
| RKG Kölsch | 4.0 | 3.0 | 4.0 | 4.5 | 4.0 | 4.0 |
| Nachtmann | 4.0 | 0.0 | 3.5 | 4.0 | 0.0 | 4.0 |

TABLE AL3a-continued

| Glass Corrosion | | | | | | |
|---|---|---|---|---|---|---|
| Longdrink Arcoroc Elegance | 4.0 | 4.0 | 3.5 | 4.0 | 4.0 | 4.0 |
| Average | 3.42 | 2.83 | 3.42 | 3.67 | 3.33 | 3.92 |
| Decorated Glassware | DS | IR | | DS | IR | |
| Snoopy | 3.0 | — | | 3.5 | — | |
| Teddy | 3.0 | — | | 3.5 | — | |
| Kenia Plates | 1.5 | 4.0 | | 2.0 | 4.0 | |
| Average | 2.5 | — | | 3.0 | — | |
| Al-Plates | DA | | DA | | SU | |
| Plate | 3.5 | | 4.0 | | 34.9 | |

TABLE AL3b

| Mass Loss | | |
|---|---|---|
| | 50 cycles Mass Loss (mg) | 100 cycles Mass Loss (mg) |
| Glasses | | |
| Michelangelo | 29 | 52 |
| Octime | 15 | 22 |
| Longchamp | 76 | 109 |
| RKG Kölsch | 15 | 27 |
| Nachtmann Longdrink | 46 | 90 |
| Arcoroc Elegance | 10 | 23 |
| Sum | 192 | 323 |
| Decorated Glassware | | |
| Snoopy | 130 | 256 |
| Teddy | 48 | 99 |
| Kenia Plates | 45 | 76 |
| Sum | 223 | 431 |
| Al-Plates | | |
| Plate | 0.0 | 0.0 |

Comparative Example 3

In this Comparative Example only the base detergent formulation was used. In addition 0.67 g of zinc acetate was added to the tablet formulation The results of the tests are shown in Table AL4a (Glass Corrosion) and Table AL4b (Mass Loss).

TABLE AL4a

| Glass Corrosion | | | | | | |
|---|---|---|---|---|---|---|
| | 50 cycles | | | 100 Cycles | | |
| Glasses | GC | CL | IR | GC | CL | IR |
| Michelangelo | 0.5 | 1.5 | 0.5 | 0.5 | 1.5 | 0.5 |
| Octime | 1.5 | 1.0 | 0.5 | 2.5 | 1.5 | 0.5 |
| Longchamp | 0.0 | 1.0 | 0.0 | 0.0 | 1.5 | 0.0 |
| RKG Kölsch | 0.5 | 2.0 | 0.5 | 1.5 | 2.5 | 1.0 |
| Nachtmann Longdrink | 0.5 | 0.0 | 1.0 | 0.5 | 0.0 | 0.5 |
| Arcoroc Elegance | 1.0 | 0.5 | 1.0 | 1.5 | 1.0 | 1.0 |
| Average | 0.67 | 1.00 | 0.58 | 1.08 | 1.33 | 0.58 |

TABLE AL4a-continued

| Glass Corrosion | | |
|---|---|---|
| Decorated Glassware | DS | DS |
| Snoopy | 1.0 | 2.0 |
| Teddy | 1.0 | 1.5 |
| Kenia Plates | 1.0 | 2.5 |
| Average | 1.00 | 2.00 |
| Al-Plates | DA | DA | SU |
| Plate | 2.0 | 3.0 | 73.2 |

TABLE AL4b

| Mass Loss | | |
|---|---|---|
| | 50 cycles Mass Loss (mg) | 100 cycles Mass Loss (mg) |
| Glasses | | |
| Michelangelo | 15 | 16 |
| Octime | 2 | 0 |
| Longchamp | 7 | 17 |
| RKG Kölsch | 0 | 0 |
| Nachtmann Longdrink | 1 | 8 |
| Arcoroc Elegance | 1 | 7 |
| Sum | 26 | 48 |
| Decorated Glassware | | |
| Snoopy | 14 | 32 |
| Teddy | 5 | 16 |
| Kenia Plates | 17 | 41 |
| Sum | 36 | 89 |
| Al-Plates | | |
| Plate | 118 | 233 |

Comparative Example 4

In this Comparative Example only the base detergent formulation was used. In addition 0.19 g of bismuth citrate was added to the tablet formulation.

The results of the tests are shown in Table AL5a (Glass Corrosion) and Table AL5b (Mass Loss).

TABLE AL5a

| Glass Corrosion | | | | | | |
|---|---|---|---|---|---|---|
| | 50 cycles | | | 100 Cycles | | |
| Glasses | GC | CL | IR | GC | CL | IR |
| Michelangelo | 0.5 | 1.5 | 1.0 | 2.0 | 1.5 | 1.0 |
| Octime | 2.0 | 1.5 | 0.5 | 2.0 | 2.0 | 0.5 |
| Longchamp | 1.0 | 1.0 | 0.5 | 2.5 | 1.5 | 0.5 |
| RKG Kölsch | 0.5 | 1.5 | 0.5 | 2.0 | 2.5 | 0.5 |
| Nachtmann Longdrink | 1.5 | 0.0 | 0.0 | 2.0 | 0.0 | 0.0 |
| Arcoroc Elegance | 1.0 | 1.0 | 0.5 | 1.5 | 2.0 | 0.5 |
| Average | 1.08 | 1.08 | 0.50 | 2.00 | 1.58 | 0.50 |
| Decorated Glassware | DS | | | DS | | |
| Snoopy | 1.0 | | | 1.0 | | |
| Teddy | 0.5 | | | 1.0 | | |
| Kenia Plates | 0.5 | | | 0.5 | | |
| Average | 0.67 | | | 0.83 | | |

TABLE AL5a-continued

| Glass Corrosion | | | |
|---|---|---|---|
| Al-Plates | DA | DA | SU |
| Plate | 3.0 | 4.0 | 28.0 |

TABLE AL5b

| | Mass Loss | |
|---|---|---|
| | 50 cycles Mass Loss (mg) | 100 cycles Mass Loss (mg) |
| Glasses | | |
| Michelangelo | 3 | 6 |
| Octime | 0.5 | 4.5 |
| Longchamp | 23 | 48 |
| RKG Kölsch | 14 | 26.5 |
| Nachtmann Longdrink | 4 | 10 |
| Arcoroc Elegance | 5 | 5 |
| Sum Decorated Glassware | 49.5 | 100 |
| Snoopy | 5 | 11 |
| Teddy | 0 | 7 |
| Kenia Plates | 0 | 0 |
| Sum Al-Plates | 5 | 18 |
| Plate | 104.5 | 217 |

Comparative Examples 1 to 4 show that aluminium materials without protection dissolve, lose shine and cause iridescence on glassware Addition of sodium disilicate eliminates the dissolution of aluminium materials. However, the aluminium is discoloured, turning an unpleasant brownish-black colour also the shine of the aluminium material is gone. Moreover, sodium disilicate has a negative effect on glassware: glass clouding, line corrosion and even iridescence (due to silicate rather than aluminium) occur.

Furthermore the mass loss of clear and decorated glassware is increase and the decoration protection (given by the dissolving aluminium) is no longer present.

Addition of zinc acetate reduces the mass loss of the aluminium plate (to a level $1/20^{th}$ that as in the absence of zinc). Iridescence and glass corrosion is also improved. However, the performance on decoration protection is still poor.

Addition of bismuth citrate reduces the mass loss of the aluminium plate in a similar level to that observed with the use of zinc. However, discoloration of the aluminium increases. With bismuth the performance on decorated glass protection care is good, but the performance on glass corrosion care is weak.

Example 1

In this Example the base detergent formulation was used with 0.67 g of zinc acetate, 0.19 g bismuth citrate and 3.8 g of sodium disilicate.

The results of the tests are shown in Table AL6a (Glass Corrosion) and Table AL6b (Mass Loss).

TABLE AL6a

| Glass Corrosion | | | | | | |
|---|---|---|---|---|---|---|
| | 50 cycles | | | 100 Cycles | | |
| Glasses | GC | CL | IR | GC | CL | IR |
| Michelangelo | 0.0 | 1.0 | 0.5 | 0.5 | 1.5 | 0.5 |
| Octime | 1.0 | 0.5 | 0.0 | 2.5 | 1.5 | 0.5 |
| Longchamp | 0.0 | 1.0 | 0.5 | 0.0 | 1.5 | 0.0 |
| RKG Kölsch | 0.0 | 1.0 | 0.5 | 1.5 | 2.5 | 1.0 |
| Nachtmann Longdrink | 1.0 | 0.0 | 0.5 | 0.5 | 0.0 | 0.5 |
| Arcoroc Elegance | 0.5 | 1.0 | 0.5 | 1.5 | 1.0 | 1.0 |
| Average | 0.42 | 0.75 | 0.42 | 1.08 | 1.33 | 0.58 |
| Decorated Glassware | DS | | IR | DS | | IR |
| Snoopy | 0.0 | | | 0.5 | | |
| Teddy | 0.5 | | | 0.5 | | |
| Kenia Plates | 0.0 | | 0.0 | 1.0 | | 0.0 |
| Average | 0.17 | | | 0.67 | | |
| Al-Plates | DA | | DA | | | SU |
| Plate | 0.5 | | 1.0 | | | 124.83 |

TABLE AL6b

| | Mass Loss | |
|---|---|---|
| | 50 cycles Mass Loss (mg) | 100 cycles Mass Loss (mg) |
| Glasses | | |
| Michelangelo | 2 | 4 |
| Octime | 0 | 0 |
| Longchamp | 1 | 0 |
| RKG Kölsch | 5 | 5 |
| Nachtmann Longdrink | 3 | 2 |
| Arcoroc Elegance | 1 | 2 |
| Sum Decorated Glassware | 12 | 13 |
| Snoopy | 2 | 2 |
| Teddy | 0 | 0 |
| Kenia Plates | 0 | 0 |
| Sum Al-Plates | 2 | 2 |
| Plate | 16 | 16 |

The results of Example 1 show that the presence of a combination of zinc, bismuth and disilicate gives good protection to aluminium such that the corrosion is low and the aluminium keeps its shine. Additionally this combination minimises detrimental effects on glassware: iridescence, glass corrosion on plain and decorated glassware is all vastly reduced.

The invention claimed is:

1. A method for protecting glassware from corrosion in an automatic dishwashing process comprising providing a composition comprising zinc and bismuth into a dishwasher and washing the glassware in the presence of said composition, wherein the mass ratio of zinc to bismuth in the composition is 1:100 to 100:1, wherein the corrosion is caused by exposure of the glassware to aluminum.

2. The method according to claim 1 wherein the ratio of zinc to bismuth in the composition (by mass) is from 1:10 to 10:1.

3. The method according to claim 1 wherein the amount of zinc and bismuth provided to a dishwasher cycle is from 1 to 1000 mg.

4. The method according to claim 3 wherein the amount of zinc and bismuth provided to a dishwasher cycle is from 5 to 500 mg.

5. The method according to claim 1 wherein the composition comprises a soluble ceramic/glass formulation.

6. The method according to claim 1 wherein the composition comprises a detergent formulation.

7. The method according to claim 1 wherein the zinc or bismuth are in metallic form.

8. The method according to claim 7 wherein the metallic form is an alloy of zinc and bismuth.

9. The method according to claim 1 wherein the zinc and/or bismuth are present as a salt or compound.

10. The method according to claim 9 salt or compound is a nitrate, oxide, sulphate, phosphate, halide, carbonate or carboxylate salt.

11. The method according to claim 9 wherein the zinc is present as zinc acetate, the bismuth is present as bismuth citrate.

12. The method according to claim 1 wherein the amount of silicate is present in a ratio to zinc and bismuth of up to 100:1.

13. The method according to claim 1 wherein the composition further comprises silicate.

14. The method according to claim 13 wherein the silicate is present as a salt.

15. The method according to claim 14 wherein the silicate is present as sodium disilicate.

* * * * *